Patented Oct. 9, 1934

1,975,803

UNITED STATES PATENT OFFICE 1,975,803

NEUTRAL COMPLEX COMPOUND OF PENTAVALENT ANTIMONY WITH ALIPHATIC HYDROXY CARBOXYLIC ACIDS AND PROCESS OF MAKING THE SAME

Hans Schmidt, Vohwinkel, near Elberfeld, Germany, assignor to Winthrop Chemical Company, Inc., New York, N. Y., a corporation of New York No Drawing. Application October 28, 1929, Serial No. 403,142. In Germany November 1, 1928

21 Claims. (Cl. 260—11)

The present invention relates to a process of preparing new neutral complex compounds of pentavalent antimony with aliphatic hydroxy-carboxylic acids and to the products obtainable thereby.

The complex compounds of trivalent antimony with aliphatic hydroxy-carboxylic acids are known and find varied application in the form of their salts, such as, for example the potassium antimonyl tartrate, the antimonyl lactate and the like.

In accordance with the present invention neutral complex compounds of pentavalent antimony with aliphatic hydroxy-carboxylic acids are prepared by causing antimonic acid or a water-soluble salt thereof and a water-soluble aliphatic hydroxy-carboxylic acid or a water-soluble salt of an aliphatic hydroxy-carboxylic acid to react upon each other in aqueous solution. Instead of antimonic acid there may be used antimony pentoxide for the purpose of my invention. As aliphatic hydroxy-carboxylic acids suitable for carrying out my new process, there may be mentioned by way of example glycolic acid, lactic acid, tartaric acid, arabonic acid and mucic acid. The proportion of the two components reacting upon each other may be varied within wide limits, however, generally care being taken, that for one molecular quantity of the antimonic acid at least one molecular quantity of an aliphatic hydroxy-carboxylic acid is present. Usually I am working with about molecular quantities. The process is carried out by dissolving the two components in water, allowing the same to react upon each other either at room, or at elevated temperature, preferably on a boiling water bath. The reaction is complete, either directly after mixing together the two components, or after several hours, depending on the temperature and on the colloidal state of the antimonic acid.

The complex compound formed is isolated by evaporating the reaction mixture or by pouring the aqueous solution into an organic precipitant, for example, alcohol or acetone. Before isolating the complex compound it has been found to be advantageous to neutralize the solution by the addition of an inorganic or organic base. My new compounds are generally water-soluble white powders, from the acidified aqueous solutions of which hydrogen sulfide precipitates antimony sulfide, and display a therapeutical action.

The invention is illustrated by the following examples, without being limited thereto:

*Example 1.*—20 grams of potassium tartrate are dissolved in 100 ccm of water and the solution is heated on a boiling water bath for several hours with an excess of freshly precipitated antimonic acid. The solution is then filtered, the filtrate neutralized with dilute caustic potash solution and the complex salt formed is precipitated by pouring the filtrate into methyl alcohol, whereby a whitish powder is obtained. Antimony sulfide is precipitated from the acidified solution by hydrogen sulfide.

*Example 2.*—15 grams of tartaric acid are dissolved in 100 ccm of water and an excess of antimonic acid is added. After a short time of heating the solution is cooled and filtered, the filtrate is neutralized with dilute caustic potash solution and precipitated by pouring into methyl alcohol. On isolating and drying there is obtained the whitish complex salt which dissolves readily in water.

*Example 3.*—15 grams of tartaric acid are dissolved in 100 ccm of normal caustic soda solution and a solution of 24.5 grams of diethylaminoethanol antimonate (obtainable from antimonic acid and diethylaminoethanol) is added. The solution is neutralized with dilute diethylaminoethanol solution and precipitated by pouring into methyl alcohol. On isolating and drying the complex antimony salt is obtained as a whitish powder which dissolves readily in water.

*Example 4.*—33 grams of gluconic acid are dissolved in 100 ccm of water and antimonic acid, freshly produced from 50 grams of antimony pentachloride, is added to the solution. When heating the mixture thus prepared on the water bath a clear solution is obtained. After filtering from any turbidity, the solution is neutralized with dilute caustic soda solution and the complex salt produced is precipitated by pouring the solution into methyl alcohol while stirring. A whitish powder is obtained which dissolves readily in water.

*Example 5.*—35 grams of mucic acid are dissolved in 66 ccm of 5 normal caustic soda solution with the addition of 100 ccm of water and antimonic acid, freshly precipitated from 50 grams of antimony pentachloride is added to the solution. When heating the mixture thus prepared on the water bath a clear solution is obtained. After cooling and filtering from any turbidity, the solution is neutralized with dilute caustic soda solution, concentrated on the water bath and the new complex compound is precipitated by pouring the solution into methyl alcohol while stirring. A whitish powder is obtained, which dissolves readily in water.

The diethylamine antimony mucate can be produced according to the directions given above when employing instead of caustic soda lye an aqueous solution of diethylamine.

In an analogous manner complex salts of pentavalent antimony with, for example, lactic acid, citric acid or the like, can be produced.

*Example 6.*—9 grams of the diethylamino-ethanol salt of antimonic acid and 15 ccm of 50% aqueous gluconic acid solution are dissolved together in water; the solution is neutralized by the addition of an aqueous diethylamino-ethanol solution and the neutralized solution is made up with water to 250 ccm. The solution containing the new complex compound can be used directly for pharmaceutical purposes.

*Example 7.*—6 grams of the diethylamino-ethanol salt of antimonic acid and 5 grams of mucic acid are dissolved in water while neutralizing the solution with diethylamino-ethanol. The neutral solution containing the complex salt is made up with water to 250 ccm and can be used directly for pharmaceutical purposes.

This application contains subject matter common to my copending application Ser. No. 403,143, filed October 28, 1929.

I claim:

1. In the process of preparing complex compounds of pentavalent antimony, the step which comprises causing antimonic acid and gluconic acid to react upon each other in aqueous solution.

2. The process which comprises adding to a solution of 35 parts by weight of gluconic acid in 100 parts by weight of water antimonic acid freshly produced from 50 parts by weight of antimony pentachloride, heating the reaction mixture on the water bath until a clear solution of the antimonic acid is obtained, and neutralizing the solution with dilute caustic soda solution.

3. In the process of preparing complex compounds of pentavalent antimony, the step which comprises causing antimonic acid and a compound of the group consisting of water-soluble saturated aliphatic hydroxy-carboxylic acids, containing at least one hydroxy group standing in alpha-position to a carboxylic group, and of water-soluble salts of said acids, to react upon each other in aqueous solution.

4. In the process of preparing complex compounds of pentavalent antimony, the step which comprises causing one mol of antimonic acid to react upon at least one mol of a compound of the group consisting of water-soluble saturated aliphatic hydroxycarboxylic acids, containing at least one hydroxy group standing in alpha-position to a carboxylic group, and of water-soluble salts of said acids, in aqueous solution.

5. In the process of preparing complex compounds of pentavalent antimony, the step which comprises causing about molecular quantities of antimonic acid and of a compound of the group consisting of water-soluble saturated aliphatic hydroxy carboxylic acids, containing at least one hydroxy group standing in alpha-position to a carboxylic group, and of water-soluble salts of said acids, to react upon each other in aqueous solution.

6. In the process of preparing complex compounds of pentavalent antimony, the step which comprises causing about molecular quantities of antimonic acid and of a compound of the group consisting of water-soluble saturated aliphatic hydroxy carboxylic acids, containing 2 to 6 carbon atoms and at least one hydroxy group standing in alpha-position to a carboxylic group, and of water-soluble salts of said acids, to react upon each other in aqueous solution.

7. The process which comprises causing antimonic acid and a compound of the group consisting of water-soluble saturated aliphatic hydroxy carboxylic acids, containing at least one hydroxy group standing in alpha-position to a carboxylic group, and of water-soluble salts of said acids, to react upon each other in aqueous solution, and neutralizing the solution.

8. The process which comprises causing one mol of antimonic acid to react upon at least one mol of a compound of the group consisting of water-soluble saturated aliphatic hydroxy carboxylic acids, containing at least one hydroxy group standing in alpha-position to a carboxylic group, and of water-soluble salts of said acids, to react upon each other in aqueous solution, and neutralizing the solution.

9. The process which comprises causing about molecular quantities of antimonic acid and of a compound of the group consisting of water-soluble saturated aliphatic hydroxy carboxylic acids, containing at least one hydroxy group standing in alpha-position to a carboxylic group, and of water-soluble salts of said acids, to react upon each other in aqueous solution, and neutralizing the solution.

10. The process which comprises causing about molecular quantities of antimonic acid and of a compound of the group consisting of water-soluble saturated aliphatic hydroxy carboxylic acids, containing 2—6 carbon atoms and at least one hydroxy group standing in alpha-position to a carboxylic group, and of water-soluble salts of said acids, to react upon each other in aqueous solution and neutralizing the solution.

11. Therapeutically active compounds containing a halogen-free radical of pentavalent antimony connected to a water-soluble salt of a saturated aliphatic hydroxy carboxylic acid, containing at least one hydroxy group in the alpha-position to a carboxylic group, said products being white powders which dissolve without decomposition in water with the formation of solutions having a neutral reaction and from which solutions, after acidification, hydrogen sulfide precipitates antimony sulfide.

12. Therapeutically active compounds containing a halogen-free radical of pentavalent antimony connected to a water-soluble salt of a saturated aliphatic hydroxy carboxylic acid, containing two to six carbon atoms, at least one hydroxy group being in the alpha-position to a carboxylic group, said products being white powders which dissolve without decomposition in water with the formation of solutions having a neutral reaction and from which solutions, after acidification, hydrogen sulfide precipitates antimony sulfide.

13. Therapeutically active compounds containing a halogen-free radical of pentavalent antimony connected to a water-soluble salt of a saturated aliphatic hydroxy carboxylic acid, containing at least one hydroxy group in the alpha-position to a carboxylic group, said products containing about one gram atom of antimony in the gram molecule and being white powders which dissolve without decomposition in water with the formation of solutions having a neutral reaction and from which solutions, after acidification, hydrogen sulfide precipitates antimony sulfide.

14. Therapeutically active compounds containing a halogen-free radical of pentavalent antimony connected to a water-soluble salt of a saturated aliphatic hydroxy carboxylic acid, containing two to six carbon atoms, at least one hydroxy group being in the alpha-position to a carboxylic group, said products containing about one gram atom of antimony in the gram molecule and being white powders which dissolve without decomposition in water with the formation of solutions having a neutral reaction and from which solutions, after acidification, hydrogen sulfide precipitates antimony sulfide.

15. Neutral complex compounds of pentavalent antimony with tartaric acid, said products being water-soluble, white powders, from the acidified solutions of which hydrogen sulfide precipitates antimony sulfide, and displaying a therapeutic action.

16. Neutral complex compounds of pentavalent antimony with tartaric acid, containing in the gram molecule about one gram atom of antimony, said products being water-soluble, white powders, from the acidified solutions of which hydrogen sulfide precipitates antimony sulfide, and displaying a therapeutic action.

17. The complex compound of pentavalent antimony with tartaric acid, containing the gram molecule about one gram atom of antimony and having been neutralized by potassium hydroxide, said product being a whitish powder, readily soluble in water, and displaying a therapeutic action.

18. The complex compound of pentavalent antimony with gluconic acid, containing in the gram molecule about one gram atom of antimony, and having been neutralized by sodium hydroxide, said product being a white water-soluble powder, from the acidified solution of which hydrogen sulfide precipitates antimony sulfide, and displaying a therapeutic action.

19. Neutral complex compounds of pentavalent antimony with gluconic acid, said products being generally water-soluble, white powders from the acidified aqueous solutions of which hydrogen sulfide precipitates antimony sulfide, and displaying a therapeutic action.

20. Neutral complex compounds of pentavalent antimony with gluconic acid, said complex compounds containing in the gram molecule about one gram atom of antimony, said products being generally water-soluble, white powders from the acidified aqueous solutions of which hydrogen sulfide precipitates antimony sulfide, and displaying a therapeutic action.

21. The complex compounds of pentavalent antimony with gluconic acid, containing in the gram molecule about one gram atom of antimony and containing diethylaminoethanol as neutralizing base, said product being a white water-soluble powder, from the acidified solution of which hydrogen sulfide precipitates antimony sulfide, and displaying a therapeutic action.

HANS SCHMIDT. [L. S.]